(12) United States Patent
Burke et al.

(10) Patent No.: US 6,769,381 B2
(45) Date of Patent: Aug. 3, 2004

(54) SEASONING SYSTEM AND METHOD

(75) Inventors: David L. Burke, Lewisville, TX (US); Jonny Fitzgerald, Garland, TX (US); Thomas G. Knodell, Jr., Fort Worth, TX (US); Kenneth C. Petri, Richardson, TX (US); P. Blake Svejkovsky, Coppell, TX (US); Paul A. Svejkovsky, 16908 FM 1469, Marquez, TX (US) 77865

(73) Assignee: Paul A. Svejkovsky, Marquez, TX (US)

( * ) Notice: Subject to any disclaimer, the term of this patent is extended or adjusted under 35 U.S.C. 154(b) by 0 days.

(21) Appl. No.: 10/042,753

(22) Filed: Jul. 23, 2002

(65) Prior Publication Data

US 2003/0164140 A1 Sep. 4, 2003

Related U.S. Application Data

(63) Continuation of application No. 09/641,190, filed on Aug. 17, 2000, now Pat. No. 6,588,363.

(51) Int. Cl.[7] .............................................. A23L 1/217
(52) U.S. Cl. .......................... 118/13; 118/16; 118/19; 118/22; 118/24; 118/308; 118/310; 118/417; 426/289; 426/292; 426/293; 426/295; 99/494
(58) Field of Search ................................ 118/13, 16, 19, 118/22, 24, 308, 310, 417; 426/289, 292, 293, 295; 99/494

(56) References Cited

U.S. PATENT DOCUMENTS 6,588,363 B1 * 7/2003 Burke et al. ................... 118/13

* cited by examiner

*Primary Examiner*—Laura Edwards
(74) *Attorney, Agent, or Firm*—Loren Helmreich; Browning Bushman, P.C.

(57) ABSTRACT

An improved seasoning system 10, 11, 13 uniformly coats a food product with the desired amount of seasoning, with the seasoning rate preferably being controlled as a function of the product volume signals from the sensors 26, 34, 108 and 110. The seasoning system preferably utilizes linear motion conveyors and either a rotating drum 36 or a deflector 98 and a second seasoning unit 112, 114 between linear conveyors 94, 96. Oil may be sprayed onto food products and tumbled in a drum 16 which both rotates and moves in a reciprocating manner with the conveyor tray 14. An improved seasoning tray 123, 144, 148 has a planar floor 122, 138, 162 with an angled discharge edge 124, 137, 182 for uniformly distributing seasoning on the product. The seasoning system minimizes damage to the food product and uniformly coats the product with a desired amount of seasoning.

31 Claims, 9 Drawing Sheets

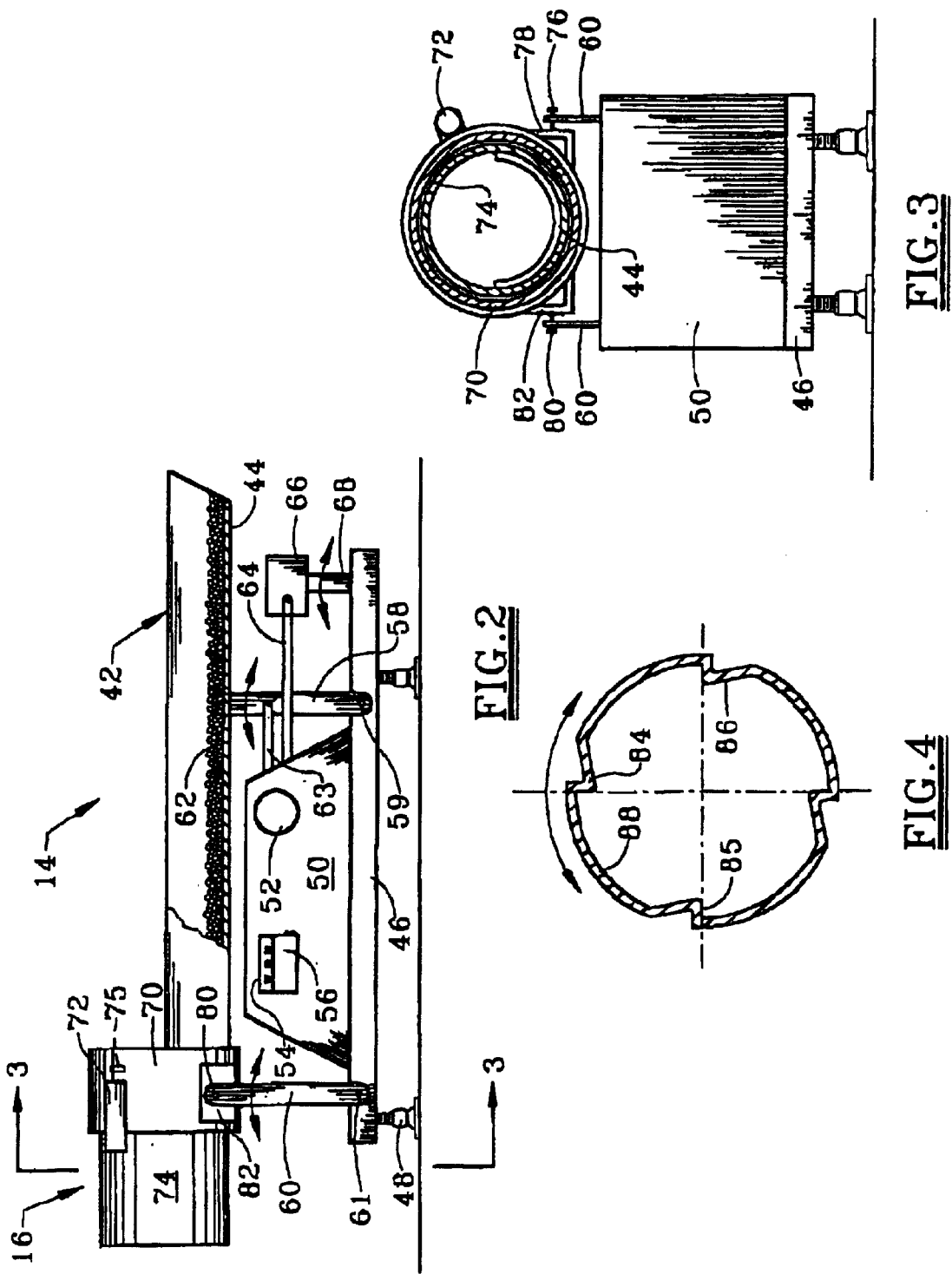

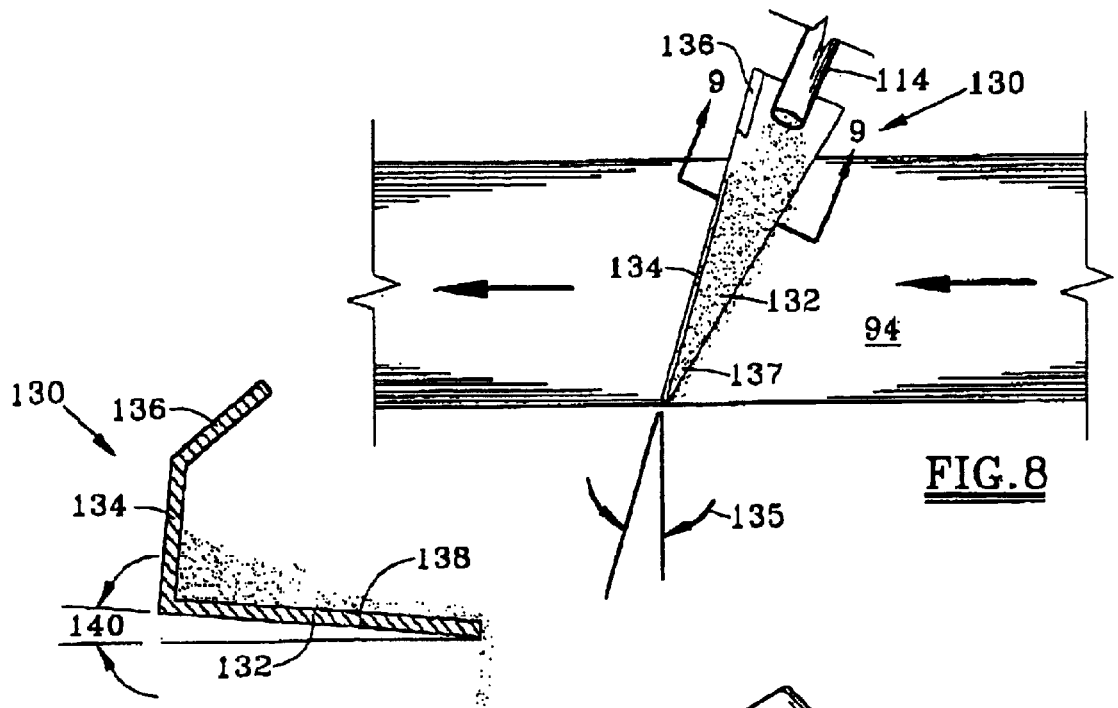
FIG. 8
FIG. 9
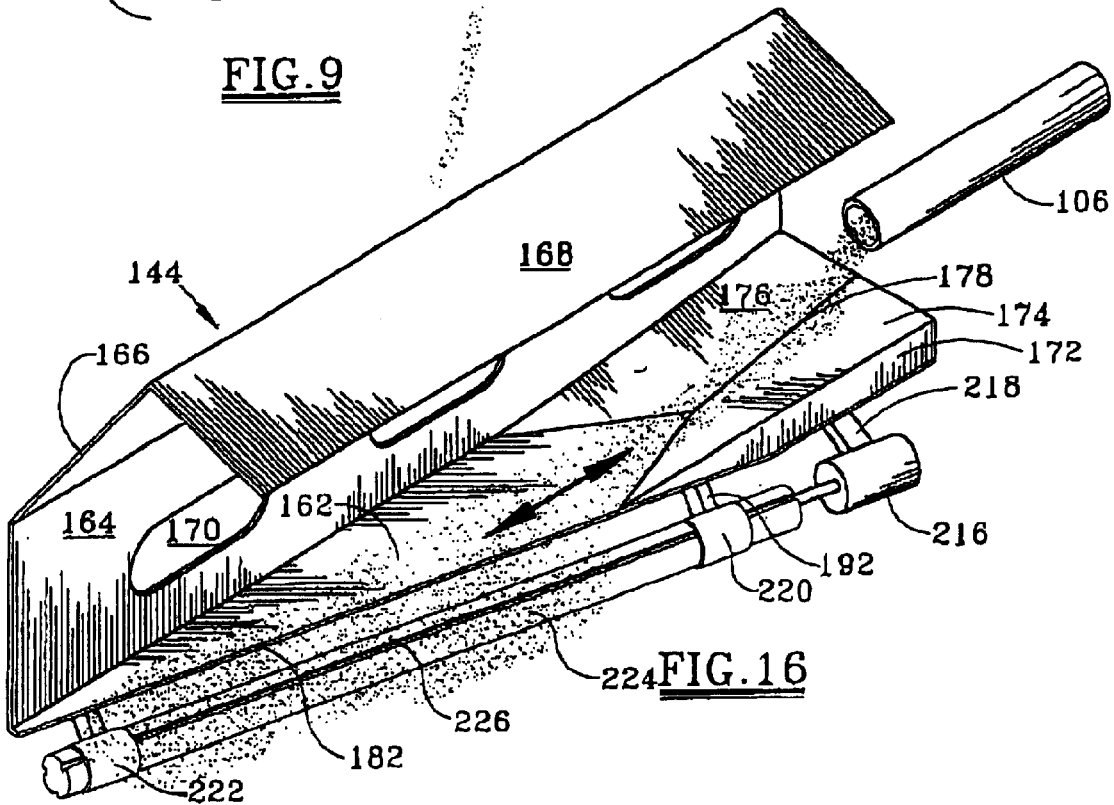
FIG. 16

SEASONING SYSTEM AND METHOD

The present application is a continuation of U.S. Ser. No. 09/641,190 filed on Aug. 17, 2000, now U.S. Pat. No. 6,588,363.

FIELD OF THE INVENTION

The present invention relates to equipment and techniques for seasoning snack foods, such as chips, in a food processing facility. More particularly, this invention relates to significant improvements which evenly and consistently coat the product with seasoning, thereby reducing the amount of seasoning used and/or increasing the customer's desire for the snack food product.

BACKGROUND OF THE INVENTION

The food processing industry has long recognized the desirability of seasoning snack foods, such as potato chips, in a consistent and even manner. This industry has thus recognized that significant cost savings and increased customer satisfaction can be obtained when each chip from a bag of potato chips is consistently and uniformly coated with the seasoning. As with other industries, the food processing industry is also interested in reducing costs by utilizing equipment which performs improved functions or performs the same functions at a lower cost than existing equipment. Moreover, the food processing industry recognizes that equipment components which contact the product should be configured for ease of cleaning, thereby maintaining the desired sanitary conditions for handling food products.

There are numerous problems that exist with current equipment and techniques for seasoning snack foods. As a primary example, existing equipment and techniques do not correctly match the desired amount of seasoning added to the incoming product flow. Current seasoning equipment relies upon the applied seasoning mass (weight) to be matched to the mass (weight) of the incoming product in an attempt to achieve the desired proportion of seasoning to the incoming product flow. This technique thus measures the weight of the product and in response thereto applies the selected amount of seasoning, although the industry recognizes that the customer is judging the appearance and taste of the chips based on area of product covered by the seasoning. This difference is critical for incoming products with a varying density. Since the density of the incoming snack food product before seasoning may vary by as much as twenty percent (20%) or more, the chip producer normally under-seasons or over-seasons, depending on the varying difference between the density of the incoming product and the density of the "base product" which matched the desired amount of seasoning. Since the weight of the seasoning may not be insignificant to the weight of the overall product, and since seasoning is recognized as either the most expensive raw ingredient or one of the most expensive raw ingredients in most snack food products, the over-application of seasoning by a producer or the loss of business based upon under-seasoning represents millions of dollars each year to the food processing industry.

For most snack food products, the area of product to be covered by the seasoning to meet the customer's appearance desires is known to be closely related to the volume of the incoming product to be seasoned. Thus conventional seasoning equipment, which weighs the incoming product, has attempted to "estimate" the volume of incoming product based upon measured weight and various other factors and formulas. These derived volumetric numbers are, however, inherently based upon weight measurements. The incoming product is conventionally weighed by a scale which may be built into the incoming product conveyor. The food processing industry has thus long desired techniques which would reliably measure the volume of the incoming product so that seasoning could be more accurately applied to produce the desired amount of seasoning on the area of the individual chips.

Current methods of checking the actual seasoning applied to the chip rely on taking a weight-based sample of a base product, applying a weight-based sample of seasoning and then monitoring the color or salt content of this mixture against periodic samples taken during a production run. Thus, even the method of checking the applied seasoning continues to rely upon weight-based correlations, although it is known that the area of chip closely matches the volume of the product, and thus a volumetric measurement system would be more accurate than a weight-based system.

Another problem with seasoning systems is that the seasoning is not evenly dispersed over the area of the product. Seasoning is conventionally brought to the incoming product through a tube attached to the end of an auger, with a row of holes in the tube that allow the seasoning to be pushed out by the auger and thus fall over the incoming product. These tubes must be continually monitored to insure that the holes do not clog. It is also difficult to correctly use this equipment so that the seasoning is dispersed over the entire area of the incoming product. In addition, these tubes must have their settings manually changed as new seasonings are used due to the seasoning granule style and its affect on seasoning flowing out of the adjustable holes in the tube.

Continued problems with the application of seasoning using the above auger have led to the use of a vibratory conveyor tray with a bias cut discharge to apply the seasoning. Use of this vibratory scarf plate avoids the necessity of using a tube with adjustable holes. This solution, however, creates new problems since the vibratory conveyor that moves the incoming product is the motion that moves the seasoning on the scarf plate. Varying product density has a significant effect on the travel rate of a product being moved with a vibratory conveyor, and accordingly the time shift between the measurement of the base product and the application of seasoning to that measured product causes a mismatch between the seasoning and the base product. Moreover, vibratory conveyors tend to develop a build-up of seasoning over time and therefore have sanitation problems or flow problems due to uneven dispersion. To eliminate this build up, a second separate vibratory drive has been used to move the scarf plate, so that the travel rates of the base product and the seasoning could be more evenly matched. This separate drive mechanism for the scarf plate increases the cost, weight, and complexity of the seasoning system, and also prevents the system from being easily cleaned, particularly during seasoning change operations.

Tumblers are conventionally used to mix the incoming product and the seasoning. Many of these rotating drums are fabricated from stainless steel, although some newer drums have been fabricated from hard plastic. While these tumbler drums effectively mix the base product and the seasoning, current drum technology also causes undesirably high product breakage.

Some products, such as tortilla chips, require oil to be sprayed on the product prior to the application of seasoning. If the seasoning and oil spray operations were performed in the same tumbler, cleaning the tumbler becomes very difficult because seasoning and oil tend to cake in the drum. It is desired therefore to apply oil upstream of the seasoning operation. Accordingly, an upstream tumble drum for mixing the product with the oil and a downstream tumble drum for mixing the oiled product with the seasoning has been used, although this again increases equipment costs. Moreover, the additional second drum requires the sacrifice of a vertical elevation in the product line, representing the height of the product incoming to the additional drum verses the height of the product discharged from that drum. The addition of this second tumble drum to a product line may thus adversely affect the height of the product as it moves through the food processing system. Also, the addition of another piece of equipment to an existing system may create problems with the increased product travel length of the new system.

Finally, and perhaps most importantly, significant problems exist between the seasoning system and downstream equipment, such as scale and bagging equipment. Generally, the food processing industry does not utilize systems which provide for real time monitoring of activities and changes to the operation of the food handling mechanisms to optimize the system. Conveyor systems which feed the downstream scale or bagger are conventionally turned "on" or "off" in response to either an on/off signal or a modulating signal from the scale or bagger. Steady state run time is important to providing consistent seasoning. To maximize the amount of steady state run time, the upstream conveyor system desirably allows for small amounts of accumulation of product within the conveyor system. Since the prior art conventionally uses only a feedback system, however, neither the upstream seasoning system nor the distribution system achieves the proper flow of product to the downstream scale or bagger.

The disadvantages of the prior art are overcome by the present invention, and an improved seasoning system and method of seasoning food products, such as chips, is subsequently disclosed which overcomes many of the problems of prior art seasoning systems and techniques.

SUMMARY OF THE INVENTION

The present invention provides a seasoning system and method which offers superior seasoning coverage, ease of use, and economical operation with superior control for various types of food products. According to one embodiment particularly designed for high flow capacity, seasoning is reliably dispersed without the need for continually adjusting the system, for cleaning clogged tube holes, or for cleaning the seasoning build up on a vibratory conveyor system. Seasoning is dispersed in a manner which provides uniform product coverage and thus the elimination of product stream "skips" by preferably dispersing seasoning in response to a signal which actually measures volume and is thus truly indicative of product area. Both this system and the subsequently described system can also be easily cleaned, thereby maintaining high sanitation conditions.

A second embodiment of an improved seasoning system is particularly well suited for seasoning systems which pass a relatively low or medium quantity of product per hour through the processing system. Both embodiments allow for an automatic and exact application of seasoning to the base product without the seasoning application being affected by changes in the density of the base product. Both seasoning systems may output a finished food product with superior appearance and taste, while simultaneously saving a significant amount of money due to high or low seasoning applications attributable to varying product density.

A low breakage tumbler is disclosed in the high-volume seasoning system for gently handling the product while achieving the desired mix of the seasoning and the base product to achieve the desired seasoning coverage. The seasoning system of this invention both facilitates operator input and allows the system to be custom configured on-site without the need for complicated programming.

It is an object of the present invention to provide an improved seasoning system which offers superior seasoning coverage of a product, low product breakage, quality repeatable results, and is easy to use and economical to operate.

It is an object of the present invention to provide an improved seasoning system which senses the volume of the incoming product rather than the weight of the incoming product stream, and disperses seasoning as a function of the sensed volume measurement. As a feature of the invention, quality control may be improved by comparing the standard with a measured sample as a function of the product volume rather than product weight.

It is a related object of the invention to provide a seasoning system which reduces or eliminates seasoning fluctuation variation due to change in base product density.

It is a feature of the invention that the seasoning system may provide a continuous "curtain" of seasoning to the product without problems associated with continual adjustments and auger hole clogging. Moreover, seasoning may be achieved utilizing a single conveyor, thereby eliminating one of the two conveyors commonly provided in prior art systems.

It is a further feature of the invention that product volume may be measured with conventional photoelectric eye and/or ultrasonic sensor technology so that the volume measurement system does not directly contact the product.

It is another feature of the invention that the conveyor trays using the seasoning system may be easily removed and cleaned. Conventional vibratory conveyor trays are heavy and commonly require removal with tools and have high seasoning build up compared to linear motion trays.

Yet another feature of the invention is that different embodiments of a seasoning conveyor are disclosed for uniformly distributing seasoning on the product. Each embodiment may be structured and operated to uniformly distribute seasoning on the product.

Still a further feature of the invention is that the seasoning system, when utilizing tumblers, preferably employs plastic tumbler liners with formed flights set at a selected angle for proper seasoning blend and minimum breakage.

It is a feature of the present invention that the seasoning system may use improved flow leveler technology which eliminates product fluctuations due to gate dumps and provides an even and constant stream of product to the seasoning equipment.

The tumbler of the present invention also preferably provides for a center discharge as opposed to an off-center discharge, thereby minimizing product breakage.

The seasoning system may be reliably operated in a manner which offers a high accumulation capacity to achieve continuous seasoning runs during intermittent downstream equipment operation, e.g., intermittent stopping of the scaling and/or bagging equipment. The seasoning system thus achieves consistency in the seasoning application with minimal stop/start problems.

These and further objects, features and advantages of the seasoning system and method according to the present invention will become apparent for the following detailed description, wherein reference is made to the figures in the accompanying drawings.

BRIEF DESCRIPTION OF THE DRAWINGS

FIG. 2 is a more detailed illustration of the mixing module generally shown in FIG. 1.

FIG. 3 is a cross sectional view of the mixing module shown in FIG. 2 with the tumbler liner removed.

FIG. 4 is an enlarged cross sectional view of the removable tumbler liner.

FIG. 8 is a top view of an alternate embodiment of the seasoning conveyor according to the present invention positioned above a product tray.

FIG. 9 is cross sectional view of the seasoning conveyor shown in FIG. 8.

FIG. 16 is a pictorial view of yet another embodiment of a seasoning conveyor including a shaft driven by a motor.

DETAILED DESCRIPTION OF PREFERRED EMBODIMENTS

Figure 7:
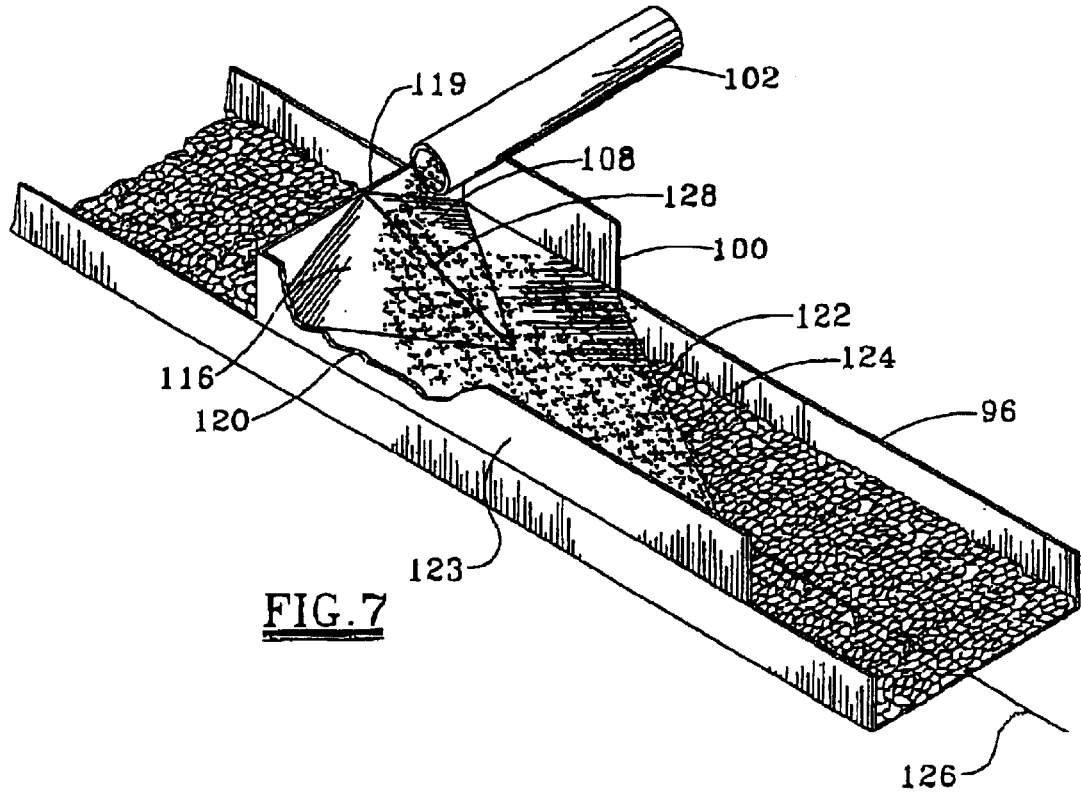
FIG. 7 is a pictorial view of both the seasoning pan and a product pan for the seasoning system of the present invention.

As explained subsequently, FIGS. 1–5 disclose one embodiment of a system according to the present invention, and FIG. 6 discloses another embodiment of the present invention. The preferred seasoning distribution pan as shown in FIG. 7 may be used in either embodiment.

Figure 1:
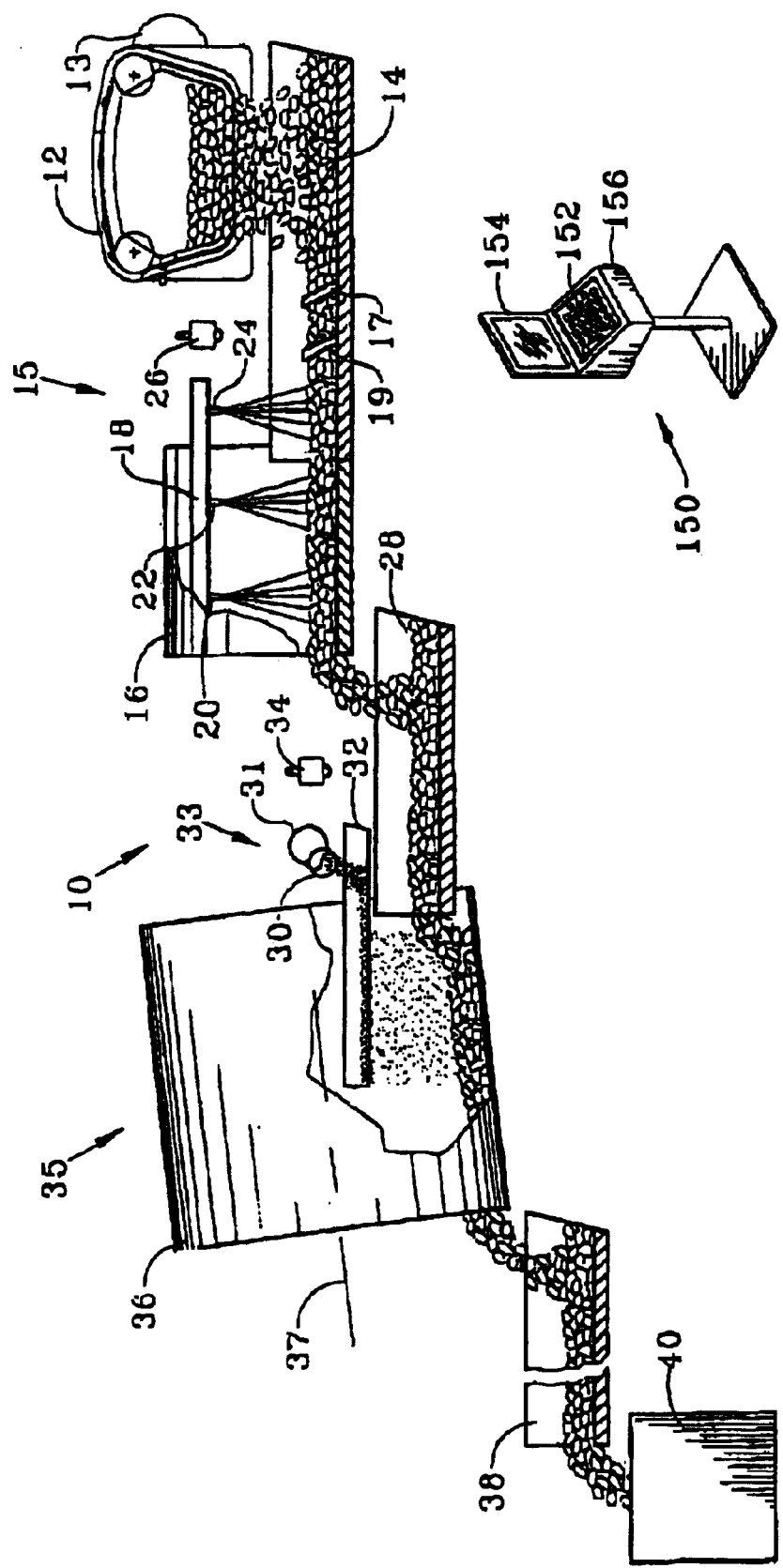
FIG. 1 is a highly simplified illustration illustrating one embodiment of a seasoning system according to the present invention.

FIG. 1 simplistically depicts one seasoning system 10 of the present invention which is particularly well suited for food product seasoning applications wherein the product throughput is relatively high. Existing seasoning systems are capable of handling several thousand pounds of incoming food product per hour, and even higher product throughput rates for future equipment are likely.

The seasoning system 10 starts with product incoming to the seasoning system having the product flow rate regulated by a separate conveyor or a proportional gate such as the gate mechanism 12 generally shown in FIG. 1. Other proportional gate mechanisms or conventional gate mechanisms may be used to control the product flow rate into conveyor 14. A preferred proportional gate is disclosed in pending U.S. application Ser. No. 09/251,516 filed on Feb. 17, 1999, which is hereby incorporated by reference. The seasoning system 10 includes a conveyor 14 which, as explained subsequently, may be powered to produce the desired linear motion to move product along the tray by the drive assembly shown in FIG. 2. Only the tray or pan of the conveyor 14 is shown in FIG. 1. The seasoning conveyor 14 may include a flow leveling device to ensure a fairly uniform level of product moving along the conveyor. A suitable flow leveling device may include a lateral row of inclined pins 17 and another row of inclined pins 19. Further details regarding a preferred flow leveling device are disclosed in U.S. application Ser. No. 09/320,355 filed on May 26, 1999.

The primary components of the seasoning system as shown in FIG. 1 are a mixing module 15, a seasoning module 35, and an improved seasoning pan or tray 32. For this exemplary application, the food product discussed below is potato chips. Those skilled in the art will recognize the benefits of the present invention to other foods products.

The mixing module 15 includes a linear motion conveyor 14 and a tumble drum 16. The product thus moves past spray nozzles 20, 22 and 24 each supplied with a desired spray, such as oil, from spray header 18. The spray nozzles may spray chips on the conveyor 14 and/or within the drum 16. Those skilled in the art will appreciate that potato chips are not usually sprayed with oil, and that the oil spray operation is described herein since oil or other liquid spray is conventionally sprayed on other food products.

The depth of the product in the tray 14 can be reliably sensed by sensor 26. Various sensors may be used for sensing the vertical height of the top layer of the product being conveyed and thus directly sensing the depth of the product in the tray. The preferred sensing technique does not require that any product be contacted by the sensor. A preferred photooptic sensor may utilize dual photo eyes to substantially reduce operator adjustment. The purpose of the sensor and its role in the operation of the seasoning system is discussed below.

As shown in FIG. 2, the linear motion conveyor 14 includes an elongate tray 42 for moving goods longitudinally along the tray. The tray 42 has a semicircular tray floor 44 for supporting the transported goods thereon.

The conveyor 14 includes a base 46 that may be supported on a plurality of adjustable leg supports 48. A plurality of substantially vertical support members 58, 60 are pivotally connected at 59, 61 to the base 46, and are similarly pivotally connected to the tray 42 as shown in FIG. 3. The support members 58, 60 thus extend upward to pivots that are connected to the tray 42. Other types of support members may be used for supporting the tray, including vertical supports for suspending the tray from ceiling structures.

The conveyor 14 includes a fixed support 50 that is rigidly connected to base 46. A powered drive mechanism, and preferably an electric drive motor 52, is provided for powering crank arm 63, which in turn is pivotally connected to one of the tray supports. The powered drive mechanism cyclically moves the tray supports 58, 60 forward and backward, thereby similarly moving the tray 42 a desired stroke length with each cycle. The powered drive mechanism 52 thus moves the tray slowly forward and then more quickly backward, with the goods sliding along the tray during the backward movement of the tray 42. A plurality of operator selected controls 54 are shown for regulating operation of the powered drive mechanism 52, i.e., to regulate the frequency of the conveyor movement, which is typically about 200 strokes per minute. An automated control station 56, which may include one or more computers, may also be provided for automatically controlling operation of the drive motor 52. The stroke length for linear motion conveyors typically varies from 1 inch to 2 inches. In an exemplary application, the drive mechanism 52 imparts a desired stroke length of from 1.4 to 2.0 inches, and preferably about 1.6 inches, to the conveyor tray 42 and cyclically moves the tray in the forward and the backward directions. Further details with respect to suitable drive mechanisms for a linear motion conveyor are disclosed in U.S. Pat. Nos. 5,351,807 and 5,794,757. A suitable machinery mount 48 for achieving the desired inclination to the base 46 and thus the tray 42 is disclosed in U.S. Pat. No. 5,842,678.

The drive motor 52 also preferably powers one or more counterweights 66, as shown in FIG. 2. Each counterweight may be supported on one or more vertical supports 68 pivotally connected to the base 46. Counterweight movement in the forward and backward directions may be obtained via crank arm 64 powered by motor 52. The counterweights are sized for minimizing vibration and "knocking" of the conveyor drive mechanism.

Referring to FIG. 1, both sides of the product may be reliably coated in the tumble drum 16. For food products which do not utilize a spray, mixing module 15 may thus be omitted from the system 10. For the present, it should be understood that the drive mechanism for the linear motion tray 14 as shown in FIG. 1 also preferably drives the tumbler 16 which has its own rotary drive mechanism 72, as shown in FIG. 2. The tumbler 16 as generally shown in FIG. 1 may thus be moved both linearly backwards and forwards with the tray 14, with the drum also rotating the desired speed by the drive motor 72. This feature allows the drum to output product in a continuous process without the tumbler drum axis being inclined. This may be very important to the operator, since the "horizontal" or non-inclined drum axis for the drum 16 results in very little if any product height in the conveying system line being lost.

The product is thus fed to linear motion conveyor 28, which also includes a linear motion conveyor tray preferably powered by the drive mechanism simplistically shown in FIG. 2. The depth of product in the tray of the conveyor 28, if desired, may again be sensed by depth sensor 34. The seasoning tray 32 may be secured to the tray of conveyor 28, and thus moves in a reciprocating manner in response to the linear motion conveyor drive. Seasoning may be supplied to the tray 32 by conventional auger 30.

The seasoning module 35 thus includes a linear motion product conveyor 28 and a seasoning tray 32, which together convey seasoned product into the seasoning tumble drum 36. The depth sensor 34 thus senses the depth of the product in the tray of conveyor 28 at a particular location within the seasoning module. This depth sensor measurement is taken within a tray with a fixed configuration. A signal from sensor 34 of the elevation or depth sensed is thus directly related to a product volume signal. A horizontal motion conveyor is preferably used to measure the varying bed depth and thus the varying volume of product passing along the conveyor at any point in time, since a horizontal motion conveyor travel rate for varying product bed depths and product densities is substantially uniform. Since product moves along a linear motion conveyor at a highly controlled product travel rate, this enables one to determine the actual volume of product moving within the seasoning system at any selected location, and thereby automatically control the drive motor 13 which powers the proportional upstream gate 12 to match the requirements of a downstream scale/bagging system 40. This volume measurement also controls the motor 31 powering the auger 30, and thereby controls the amount of seasoning delivered by the auger 30. If a conventional gate rather than a proportional gate such as gate 12 is utilized, the speed of the upstream conveyor system, such as the Fastback™ conveyor system available from Heat and Control, Inc., may be adjusted to control the amount of product being delivered to the conveyor 14.

The seasoning tumbling drum 36 may be designed and sized for handling high product flow rates, with the axis 37 inclined relative to the horizontal linear motion tray of conveyor 28. The tumbling drum 36 thus coats the product on all sides with the seasoning. The output from the tumble drum may supply a cross feed conveyor 38, which again may be of the Fastback™ configuration discussed above. The cross feed conveyor 38 may then transfer the product to conventional downstream equipment 40. Those skilled in the art will understand that the equipment 40 may be a product scale or packaging system, or may be other process system equipment.

According to the method of the invention, the seasoning system 10 preferably employs horizontal motion conveyors, such as conveyors 14, 28, and 38 as shown in FIG. 1, and one or more ultrasonic photo electric sensors 26, 34 sense the depth of the product, and thus the volume of product, moving through the seasoning system at a selected location. The system 10 has benefits from the sanitary design of the tray of the horizontal motion conveyor, which may be made from stainless steel, and the ability of the horizontal motion conveyor to convey varying bed depths without changing travel rates. This permits the use of a conventional program which recognizes the fixed measurements of the tray and the sensors to effectively measure the actual volume of the product going through the system which, as explained above, highly correlates to the area of the product. The output from the sensors 26, 34 thus allows a computer to automatically control both the flow rate of product passing to and through the seasoning system (by controlling the motor 13 and the drive motor powering the linear motion conveyors), and the flow rate of seasoning applied to the incoming product (by controlling the motor 31). The seasoning applicator 30, which may be a simple auger style system without adjustable port holes, thereby properly meters the amount of seasoning applied to the incoming product. Measuring the volume of the product with the sensors 26, 34 thus eliminates fluctuations in seasoning as a function of product density, and thus provides a more accurate method of seasoning the product according to customer's expectations. The same product volume measurement system may be obtained utilizing the depth sensors 108 and 110 shown in the FIG. 6 embodiment.

The seasoning system of the present invention thus takes the desired amount of product required by the downstream equipment 40 and feeds the product forward to the seasoning system so that the inflow of product is more closely matched to the needs of the downstream equipment 40 which, for example, may be bagging equipment. The seasoning system thus provides a constant stream of product to the downstream equipment, and achieves smooth product flow with a minimal of product damage. Seasoning system 10 also reduces accumulation requirements for the conveyor system. In addition to a feed forward signal, a feedback signal may be utilized to accommodate the on/off responses required by film changes and other interruptions in the flow to downstream equipment 40.

For the present, it should be understood that the system as disclosed above has benefits when used in various product distribution lines, including lines with or without on-line seasoning systems. The system of the present invention allows a feed forward signal from the product volume sensors 26, 34, 108, and 110 to be coupled with a proportional gate such as gate 12 in a distribution line which can then direct product to, for example, the proper bagging unit of a bagging system. Each volume depth measurement sensor 26, 34, 108 and 110 may use dual photo eyes to eliminate manual photo eye adjustments. Since the volume may be reliably measured without the measurement system contacting the product, this technique eliminates weigh-belt tracking and reduces sanitation and maintenance concerns. This volumetric measurement system thus improves overall performance of the entire system for processing food products by providing quality feed product to the scales and/or baggers.

One or more linear motion conveyors within the system may thus be sped up or slowed down to achieve the desired product rate to optimize the performance of the downstream equipment. The rate of product moving along each of the linear motion conveyors in the system may thus be carefully controlled to achieve the optimum desired speed for that particular conveyor. One can thus incorporate linear motion conveyors to numerous food product handling systems and control the operation of each conveyor in the system determined as a function of the entire system needs based upon the measured volume of the product at specific locations in the system. The system may thus supply product to several bagging units which are intermittently operated at a higher than normal speed rate to compensate for the loss of one or more baggers from the system due, for example, to film changes or other problems. The system for sensing product volume offers benefits to the overall packing efficiency, management control, and reduced product accumulation in the food processing system. These benefits, in turn, reduce equipment cost, eliminate product breakage, and reduce the dwell time associated with accumulation that can cause stale product.

The mixing module 15 as shown in FIG. 1 incorporates both the oil spray and the tumble action into a horizontal motion conveyor. This can be accomplished with a tumbler sized to be moved with the tray 14 since the application of even oil spray is not as critical as even seasoning dispersion. The system as shown in FIG. 1 has significant advantages, particularly when the flow volumes can be accommodated by a relatively small size tumbler 16. The module 15 as shown in FIG. 1 eliminates the need to use an inclined tumbler since the conveyor 14 is providing the forward movement of the product through the module, thereby significantly reducing cost and space requirements. The horizontal tumble drum 16 could have its own linear motion drive mechanism and thus be supplied with incoming product from an upstream piece of equipment which was not a linear motion conveyor.

Seasoning system 10 as shown in FIG. 1 thus applies seasoning based on the measured volume of product rather than the weight of the product. The characteristics inherent in the linear motion conveyor, such as constant traveling rates with varying bed depths and zero seasoning build up, allow the sensor to accurately measure the volume of the product at any point within the system.

Figure 6:
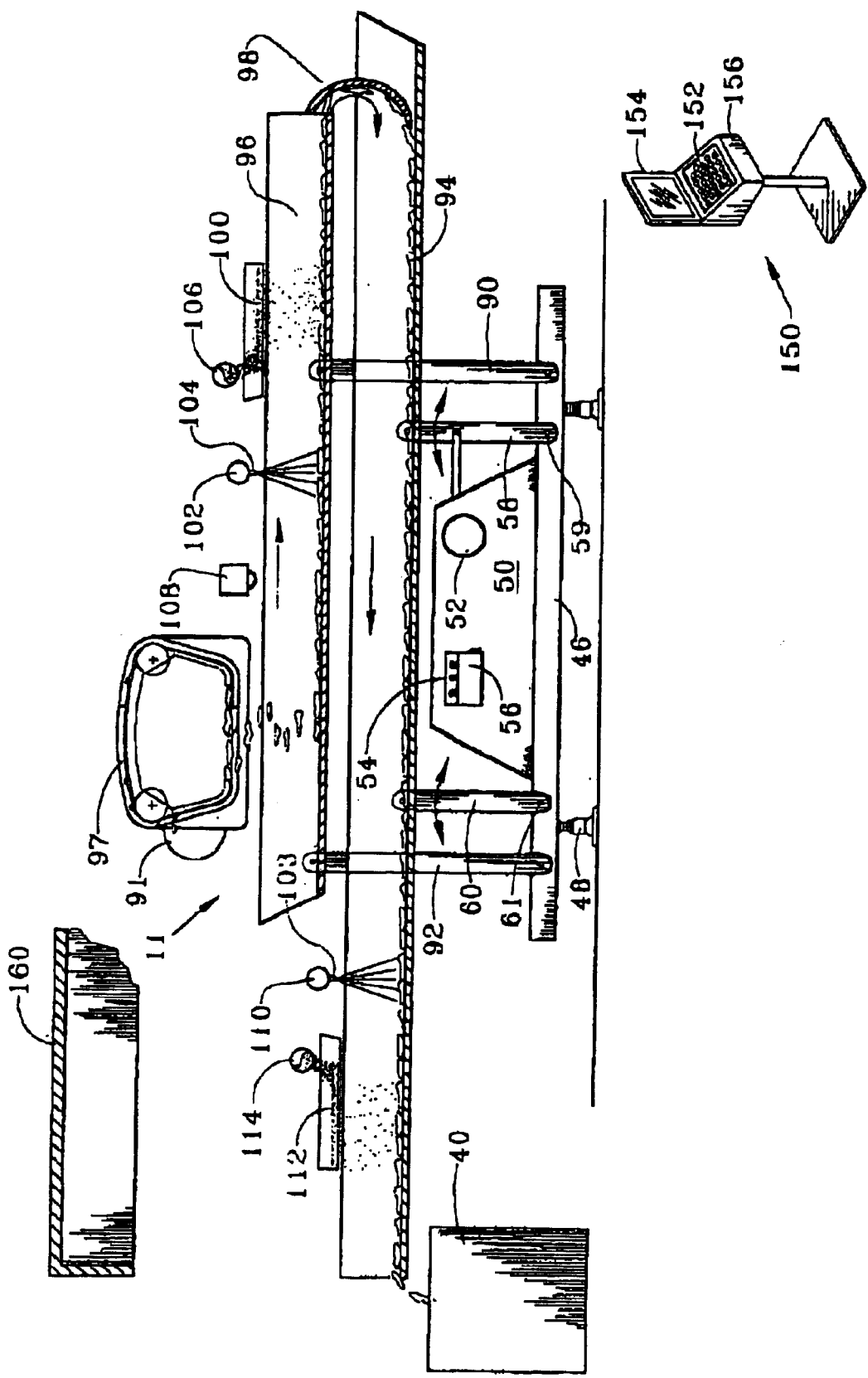
FIG. 6 is a simplified illustration of another embodiment of a seasoning system according to the present invention which is particularly well suited for low or medium product flow through rates.
Figure 10:
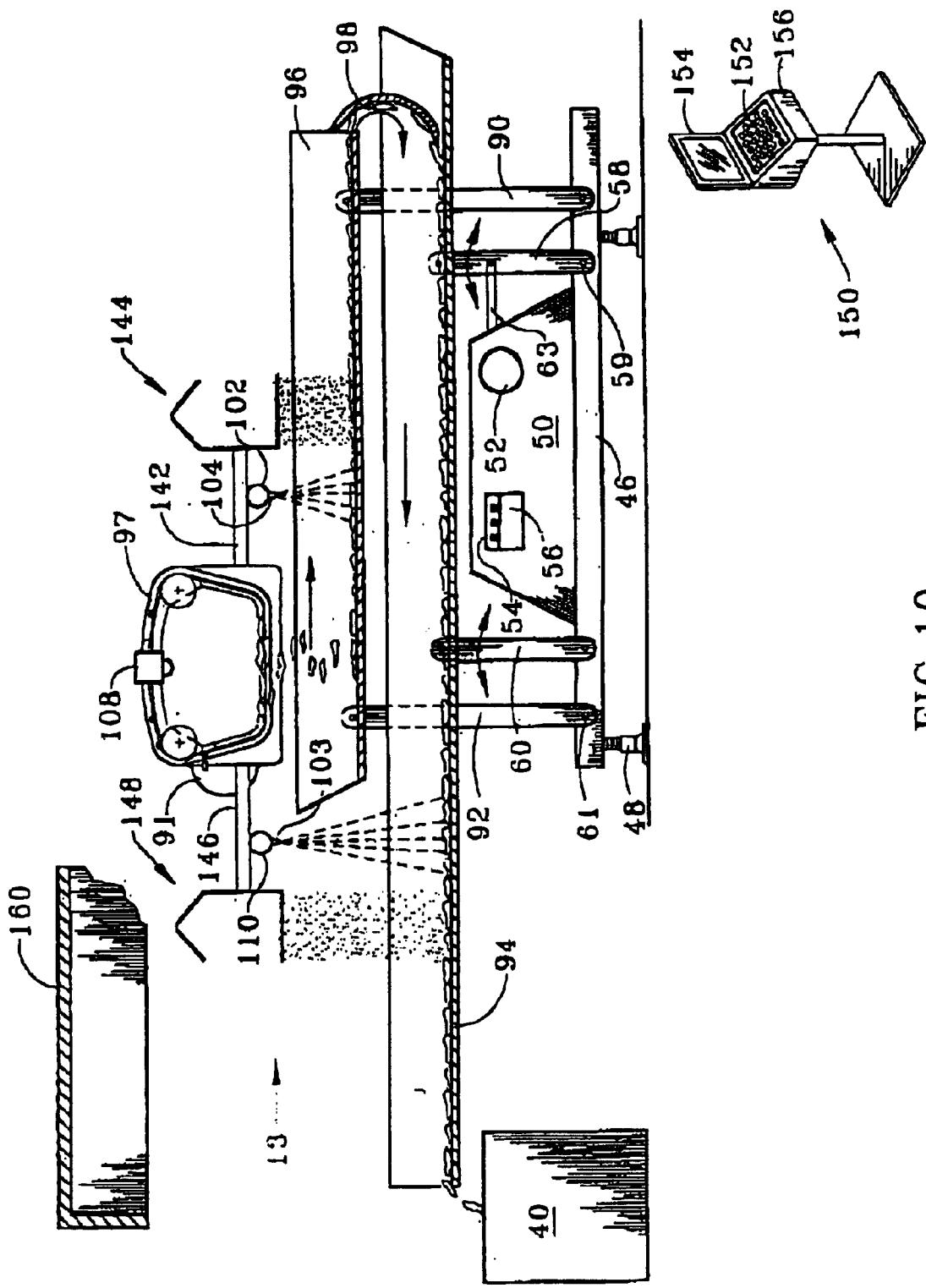
FIG. 10 is a simplified illustration of yet another embodiment of a seasoning system according the present invention which is well suited for low or medium product flow through rates.

With respect to both the system 10 as shown in FIG. 1, the seasoning system 11 shown in FIG. 6, or the seasoning system 13 as shown in FIG. 10, the discharge from the seasoning system is free of flights, thereby facilitating cleaning and allowing for a center discharge as opposed to an off-center discharge, thereby further preventing product breakage and reducing spill points. Each of the seasoning systems as disclosed in FIGS. 1 and 6 offer additional accumulation capacity, thereby allowing for continuous seasoning runs even during intermittent downstream operations.

To operate any one of the seasoning systems 10, 11 or 13, the operator may input signals to the control panel, such as panel 150, which includes an operator input keyboard 152, a computer 156 and display screen 154. The operator may select the seasoning line he wishes to alter on the panel display screen 154, which may simplistically illustrate the overall product distribution and seasoning system. The operator may also input signals indicative of the desired bag size and bag speed, or the desired pounds or kilograms per hour, of output required by that seasoning line. The operator then chooses a selected seasoning recipe and simply starts the system.

According to a preferred embodiment, the control logic within computer 156 may assume operation of the seasoning system, thereby automatically and constantly adjusting and monitoring both the base product input and the seasoning delivery amounts to achieve the desired high quality results. The operator input for bag size and bag speed, or for throughput rates, thus determines the correct throughput settings for the operation of the system gates and conveyors. A particular conveyor may thus be sped up or slowed down to increase or decrease the throughput rate for that conveyor, which in turn may affect the operation of downstream conveyors. Since the instantaneous flow rate of the volume of product to the seasoning system may thus be reliably monitored, the seasoning trays 32, 100, 112 may be carefully controlled so that the seasoning output for the selected seasoning recipe meets the exact demands of the incoming product. If desired, the operator has the ability to manually adjust the seasoning amount based on actual quality control test results by inputting data to the computer 156 via keyboard 152.

Unlike prior art systems, the seasoning system of the present invention provides for sequential feedback to all controlling parameters of the system, with the downstream equipment requirements, such as the number and size of the bags to be processed by the bagging equipment, being input by the seasoning operator at the control panel 150. Rather than merely turn components of the seasoning equipment on and off, the system of the present invention may reliably operate each of those pieces of equipment at a desired and separate product flow rate. Accordingly, the seasoning equipment operation may be primarily operated in a "sweet spot", which is the optimum uniform equipment operation to achieve the desired results with relatively high throughput rates. Control system 150 may thus input signals to all equipment based upon the determined product volume measurements at various points in the system, and calculate the desired speed or other operation of each piece of equipment to operate at a specific rate or in a predictable manner for achieving the desired mixture of product and seasoning being uniformly supplied to the downstream equipment.

Proportional gates may thus reliably control the input to the seasoning system and/or the input at various stages of the seasoning system operation. Since the measurement system of the present invention allows for the accurate measurement of product flow rate at various points in the system, each conveyor, tumbler, and seasoning auger may be operated at an optimum rate based upon the real time operation of the downstream scale or bagging equipment.

FIG. 2 is a more complete representation of the linear motion conveyor 14 and the tumbler 16 generally shown in FIG. 1. In an exemplary application, the drive conveyor as shown in FIG. 2 may be electrically powered by a one horsepower motor (0.75 kw). The conveyor drive may move the tray 42 in the desired forward/backward motion along a linear spacing of approximately 2.0 inches, and may reciprocate the 42 tray at approximately 200 cycles per minute.

FIG. 3 depicts an end view of the drive mechanism described above. Pivotal support 60 supports the frame 70 for the drum assembly 16. Brackets 78, 82 are thus each fixed to the frame 70 with the pivotal connection 76, 80 interconnecting the reciprocating supports 60 with the rotating drum assembly. The drive motor 72 thus rotates the drum 74 and thus the product contained therein. Removable liner 88 as discussed below has been removed from the rotating drum 74 to better depict the other components shown in FIG. 3. When in use, the liner 88 will normally be secured to the rotating drum 74 by conventional securing members.

Figure 5:
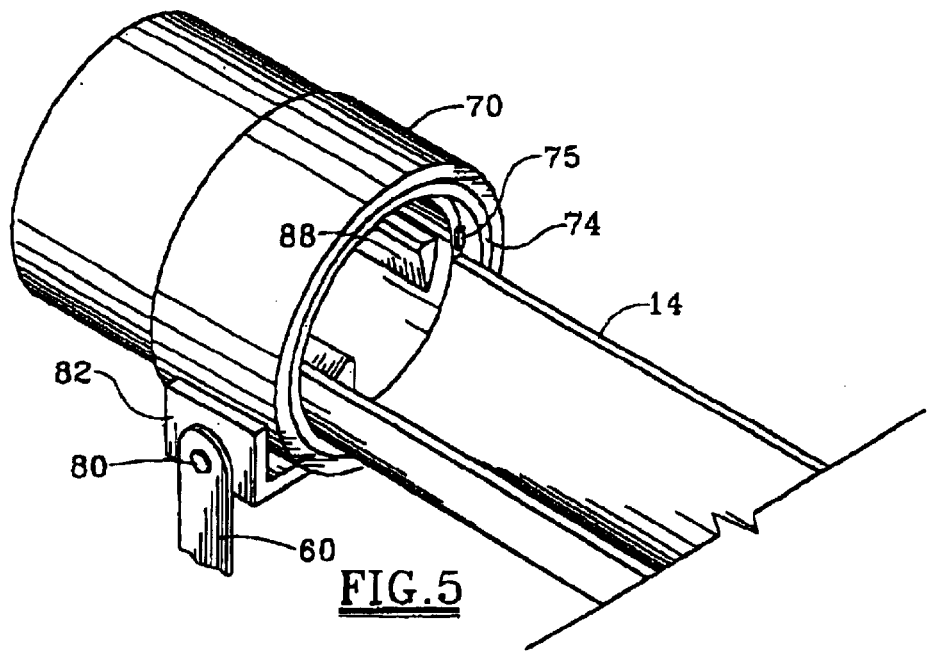
FIG. 5 is a pictorial view of the tumbler generally shown in FIG. 2.

FIG. 4 illustrates a relatively soft pliable liner fabricated from a food grade plastic for positioning within the interior of the rotating drum 74. Liner 88 may be easily and quickly removed and replaced with another liner for different seasoning changes. The liner preferably incorporates rounded edges of its flights, as shown in FIG. 5. The flights may be axially recessed from each end of the line. A relatively short axial spacing of, e.g., 8 inches between the downstream end of the liner and the downstream end of the flights ensures that product discharged from the drum assembly 16 desirably is substantially at the same horizontal position as the axis of the rotating drum. This has particular advantages over prior art drums which discharge product horizontally from this axis and thus alter the central axis of the product flow plan. The soft liner cushions the product as it is tumbled. The liner may be manually cleaned by hand within the rotating drum, or may be removed for a wet cleaning operation. The drum 74 itself is preferably fabricated from stainless steel. It is largely the weight of the drum 74 that limits the size of the system that can incorporate with and linearly move with the conveyor tray 42. The liner 88 may easily be removed and replaced with another liner during periodic cleaning of other equipment within the seasoning system. A liner stop 75 as shown in FIG. 2 may be provided for controlling the position of the forward edge of the liner 88 with respect to the non-rotating tray 44. Compared to a standard rotating drum which utilizes a stainless steel drum, the liner of the tumble drum according to the present invention may be made with plastic which, due to its characteristics, inherently provides a cushioned interface for the rotating product, thus resulting in reduced product breakage.

As shown in FIG. 3, the tray or pan of the conveyor 14 has a semicircular configuration. Either the entire length of the tray may be uniform in configuration, or a transition piece may be provided along the length of the tray so that the tray terminates in a semi-circular configuration. The non-rotating tray thus butts against rotating liner 88 secured to the cylindrical tumble drum 74, which may be rotated by the drive motor 72. The rotating drum 74 may thus pass under the tray of convey 14. This system thus couples a rotating pan or tumble drum with a reciprocating pan. Seals may be used between the reciprocating pan and the rotating and reciprocating pan. Module 15 as shown in FIG. 1 thus incorporates desirable features of a linear motion conveyor to result in a combination conveyor and tumble drum system.

As shown in FIGS. 4 and 5, the tumble drum 88 preferably provides for a reversing flight design. Four circumferentially spaced elongate rib members 84 may be provided, each of which is secured to or preferably formed as part of the otherwise sleeve-shaped liner 88. Each rib 84 may have a flight 85 at a selected angle, and a flight 86 at another selected angle. The product will thus be engaged by the flights 85 when the drum 74 and the liner 88 are thus rotated in one direction, and will engage flights 86 when liner 88 is rotated in the other direction, with rotation being achieved by the reversible drive motor 72. Each of the flights 85, 86 may be set at a selected angle for proper seasoning blend with minimum product breakage. In a particular embodiment, the flights may be fixed yet provide two predetermined angles, thereby allowing for reversed tumble action on previously salted or unseasoned products and reducing product breakage. In an exemplary embodiment, each rib may have a flight 85 which resides within a plane passing through the center of the rotating insert 88, and another flight 86 angled as shown in FIGS. 4 and 5. Flight face 85 may thus have a 70 to 80 degree face for highly tumbling product, while the flight 86 provides a degree face for relatively light tumbling of the product when the rotation is reversed. The reduced lift flight may be used, for example, when tumbling unseasoned products.

FIG. 6 illustrates an alternative seasoning system 11 according to the present invention, which utilizes two linear motion conveyor trays 94, 96, each driven by a single drive mechanism. As explained subsequently, the drive mechanism moves the two trays simultaneously, with product going in opposite directions, as illustrated in FIG. 6. In this seasoning system 11, product may be delivered to the upper tray 96 by a conventional distribution system, and preferably a system equipped with a proportional gate such as gate 97 powered by motor 91. Preferably the width of both the upper pan 96 and the lower pan 94 is sufficiently wide to allow the product to be spread thinly on the trays. The drive mechanism shown in FIG. 6 may thus be sized for reciprocating the lower pan 94 but may otherwise generally have components as shown in FIG. 2 and discussed above. Supports 60 and 58 thus support the lower pan 94 in the same manner that these components supported the pan 44 shown in FIG. 2. Another pair of pivotal supports 90, 92 thus reciprocate the upper pan 96. The seasoning tray 100, 112 may thus be fixed to respective pan 96, 94, and thus may evenly distribute seasoning on the product, as shown in FIG. 6.

A single drive unit as shown in FIG. 6 may thus move the product through an entire seasoning operation. The weight of the tray 96 in combination with seasoning tray 100 may be controlled so that the upper tray 96 effectively provides for the counterweight to minimize the vibration and knocking. A counterweight 66 as shown in FIG. 2 thus need not be provided for the seasoning system as shown in FIG. 6, since the weight of the tray 96 may provide part or all of the purpose served by the counterweight 66. Also, those skilled in the art will appreciate that, if desired, the spray nozzles 103 and the seasoning tray 112 could be provided directly under the upper tray 96, so that the length of the upper and lower trays were substantially equal.

As the product travels to the right in the upper pan 96, its depth is measured by the ultrasonic sensor 108 or other suitable volumetric measuring device. This volume depth, when combined with a known pan width and product travel rate, thus effectively determines the instantaneous volume of the product being handled by the system at the location of the sensor. This volumetric measurement may be compared to the volume required by the scale or other downstream equipment 40, and the proportional gate 97 automatically adjusted to meet the system requirements. The product volume determination also preferably determines the amount of spray (if required) and the required amount of seasoning.

Pressurized oil may be provided in header 102 and sprayed from the plurality of spray nozzles 104. Auger 106 applies seasoning to seasoning tray 100 which distributes seasoning on the top layer of the chips. The chip layer is turned by the u-plate 98, which is preferably fixed to the tray 96 and thus moves relative to tray 94. A relatively short spacing of from ⅛ inches to ½ inches, and preferably about ¼ inches, vertically separates the lower surface of plate 98 and the upper supporting surface of the tray 94. The mechanism 98 thus turns the chips upside down, so that the underside of a chip now becomes the top of the chip which may be sprayed from nozzles 103 fed by header 110, with seasoning being applied from seasoning tray 112 supplied by auger 114. The deflector 98 thus causes the product to be turned over, exposing the unseasoned side. The product is conveyed to the left on the lower pan 94, where the exposed side is then oiled and seasoned. In the seasoning system, oil spray may thus be applied in two different areas so that the combination of seasoning stage 1 and seasoning stage 2 effectively season both sides of the chip. Fully seasoned product is then ready to be delivered to downstream equipment 40, such as scale or packaging equipment. Oil spray and seasoning augers may be automatically adjusted to meet the desired requirements for both the upper tray 96 and the lower tray 94, with control signals provided by a control panel 150 with a computer 156.

The seasoning system 11 as shown in FIG. 6 utilizes inherent advantages of a horizontal motion conveyor and a specially designed seasoning pan, as discussed below, to convey the seasoning to the product. The entire seasoning module 11 may be packaged as a single unit which takes up little space. The desired horizontal motion eliminates seasoning build up, which in turn eliminates the need for an additional drive mechanism, while allowing the seasoning module to be easily removed for cleaning.

The deflector 98 thus caused the 180 degree turn loops the product over so that a second application of seasoning can be applied to the other side of the chip. To make the turn accurately, the product has a thin cross section, and thus the use of wide pans are important to provide a small bed depth of product to obtain even dispersion. Linear motion conveyors are particularly well suited for making the turn with a relatively simple deflector 98. Belt conveyors do not allow the product to be accurately turned and therefore will not turn over a high percentage of the chips. Vibratory conveyors could be used instead of linear motion conveyors, but vibratory conveyors tend to build up with seasoning. If desired, hood or hat 160 as shown in FIG. 6 may be provided over the top of the trays 94, 96 to prevent any product from falling onto the trays and protecting the product as it moves through the seasoning operation.

As shown in FIG. 6, the upper and lower product trays move the goods in a reverse direction, and both product trays are powered by the same drive mechanism. In less desired embodiments, a separate drive mechanism may be provided for each of the product trays, which would allow the seasoning product to move in the same direction along the seasoning system. Nevertheless, the product deflector would still be used for inverting the product as it passed off the upper product tray and was input to the lower product tray. The seasoning system 11 as shown in FIG. 6 has substantial advantages in that no rotating drum is necessary to season the food product.

Until this point, the seasoning pans 32, 100, 112 as shown in FIGS. 1 and 6 could each be understood as being a simple rectangular pan attached to the respective product pan. The preferred embodiment of the invention achieves more even distribution of seasoning over the product by using a more complex seasoning pan, such as that depicted in FIG. 7 or as discussed below for alternate embodiments. To prevent seasoning from breaking up into small bunches with void areas between the bunches, the auger 102 preferably deposits the seasoning on an inverted v-shaped downwardly and longitudinally inclined seasoning deflector 108 which preferably has two triangular-shaped sides 116 each sloping both in the forward or longitudinal direction and toward one of the sides of the seasoning tray floor 122. The two triangular sides 116 of the deflector 108 meet along ridge line 128, which is preferably aligned with the central axis 126 of both the seasoning tray and the product tray. The seasoning tray 123 thus has a supporting floor 122, conventional sides 100, 120 and upstream end 119, which are simplistically shown in FIG. 6. The tray 123 provides for a "curtain" of seasoning to be applied on the product moving along the product tray 96 by using the combination of dividing deflector 108 and an inclined angle discharge edge 124. The bias cut 124 in the seasoning pan floor 122 and deflector 108 evenly and uniformly distribute seasoning on the product moving in the product tray, such as tray 96 shown in FIG. 7.

The seasoning tray 123 is secured to and thus reciprocates with the product tray 96. The bias cut 124 is preferably angled at from about 30 degrees to about 60 degrees relative to the axis 126. The seasoning tray as shown in FIG. 7 thus achieves quality dispersion of seasoning by preventing seasoning stratification.

A suitable tray may be approximately 36 inches wide, and may be able to reliably season product at the rate of one or two thousand pounds of seasoned product per hour. The higher capacity system with rotating drums as shown in FIG. 1 may be able to handle in excess of four thousand pounds or more of product per hour.

The seasoning system as disclosed herein may benefit from improved flow leveler technology for obtaining a uniform height of product moving along the product conveyor, such as that disclosed in U.S. application Ser. No. 09/251,516 filed on Feb. 17, 1999. The trays may be removably attached to the drive mechanism by a quick clamp/release mechanism, as disclosed in U.S. Pat. No. 5,794,757. The linear motion conveyor system offers additional accumulation capacity which allows for continuous seasoning runs to accommodate intermittent downstream equipment shutdown. A linear motion conveyor with a preferred accumulator feature is disclosed in U.S. application Ser. No. 09/235,971 filed on Jan. 22, 1999 and hereby incorporated by release.

The seasoning system of the present invention allows the equipment to be automatically and efficiently operated since the volume of product in the system may be easily determined at any desired location. The linear motion conveyor system thus provides for a reliable product volume determination being handled by the system at any point, which directly relates to the area of the product desirably covered by the seasoning.

With respect to the trays 14 and 28 as shown in FIG. 1, it should thus be understood that the tray 14 along its entire length may have a semi-circular configuration, so that the rounded tray fits over a rotating drum with a slightly larger diameter, with the drum 16 both rotating and reciprocating. In tray 28 as shown for the module 35 may be a flat bottom tray since the drum 36 does not reciprocate with the tray 28. In either tray design, the elevation of the uppermost product being moved along the tray represents the depth of the product, and thus allows the sensors 26, 34, 108, 110 to effectively measure the volume of the product being conveyed. Measuring the volume with these sensors is highly reliable compared, for example, to measuring volume of product moving on a belt conveyor, since the product on belt conveyors may have high peaks and valleys and not be leveled out in a manner inherent in a linear motion conveyor. Moreover, measurement of depth of the product moving along a linear motion conveyor is a much more accurate indication of product volume than when product is conveyed on a vibratory conveyor, since the travel rate of product along a vibratory conveyor varies significantly compared to the substantially uniform travel rate commonly associated with linear motion conveyors.

Those skilled in the art should appreciate that the seasoning module 35 could incorporate a linearly reciprocated tumble drum similar to tumble drum 16 as shown for the mixing module 15. This latter embodiment would be desirable since the module 15 as shown in FIG. 1 is a single assembly which performs its desired function on the product at a constant level, while the inclined tumble drum 36 inherently has a discharge lower than its input. The product drop in vertical height required by some equipment, such as tumbler 36, may affect the overall height of the installed food process handling system, particularly in applications where the processing plant has a limited ceiling height. The tumble drum 36 may mix chips and sealing at a higher flow through capacity than a horizontal reciprocating tumble drum.

FIG. 8 discloses an alternate embodiment of a seasoning tray 130 for uniformly depositing seasoning on product moving along tray 94 in the direction shown. As with the previously disclosed embodiment, the tray 130 may be rigidly secured to the linear motion tray 94, and thus is driven by the conveyor drive mechanism previously disclosed. The seasoning tray 130 may thus be supplied with seasoning from auger 114.

As shown in FIG. 9, the seasoning tray includes a planar floor 132, a side 134, and an angled reinforcing member 136. As shown in FIG. 9, the supporting surface 138 of the floor 132 of the seasoning tray may be inclined at a selected angle 140 relative to a horizontal plane. FIG. 8 depicts that the back surface 134 of the seasoning tray is inclined at a selected angle 135 with respect to a line perpendicular to the movement of product along the tray 94. By selectively controlling the angles 135 and 140, the seasoning may be uniformly distributed across the width of the tray 94. Preferred angles 140 and 135 will depend upon the type of seasoning, stroke of the conveyor 94, and other factors. In most applications, the angle 140 will be less than 10 degrees, and the angle 135 will be less than about 20 degrees. The angle of discharge edge 137 with respect to the back plate 134 may be from about 10 degrees to about 30 degrees.

FIG. 10 depicts another embodiment of a seasoning system 13 according to the present invention which is similar in some respects to the embodiment shown in FIG. 6. Accordingly, components not discussed here and with respect to FIG. 10 will serve the purpose discussed above.

Chips are fed to the upper tray 96 from an upstream conveyor which preferably includes a proportional gate 97 which may be controlled by drive motor 91. Sensor 108 senses the depth of the product on tray 96. The conveyor which contains the proportional gate 97 is preferably a linear motion conveyor as described herein. Support arm 142 interconnects the linear motion conveyor with the seasoning tray 144 which supplies seasoning to product moving along the tray 96. If an oil spray is desired, the support arm 142 may also support the header 102 which includes a plurality of spray nozzles 104. Similarly, the support 146 interconnects the linear motion conveyor with the seasoning tray 148 which supplies seasoning to product moving along the tray 94. Oil from header 110 may be sprayed onto the chips on tray 94 by one or more spray nozzles 103. An advantage of the seasoning system 13 compared to the seasoning system 6 is that the seasoning trays 144 and 148 may have a relatively small width of three or four inches yet reliably supplies seasoning to the product moving along the trays 96, 94 which are thirty inches or more in width.

Figure 11:
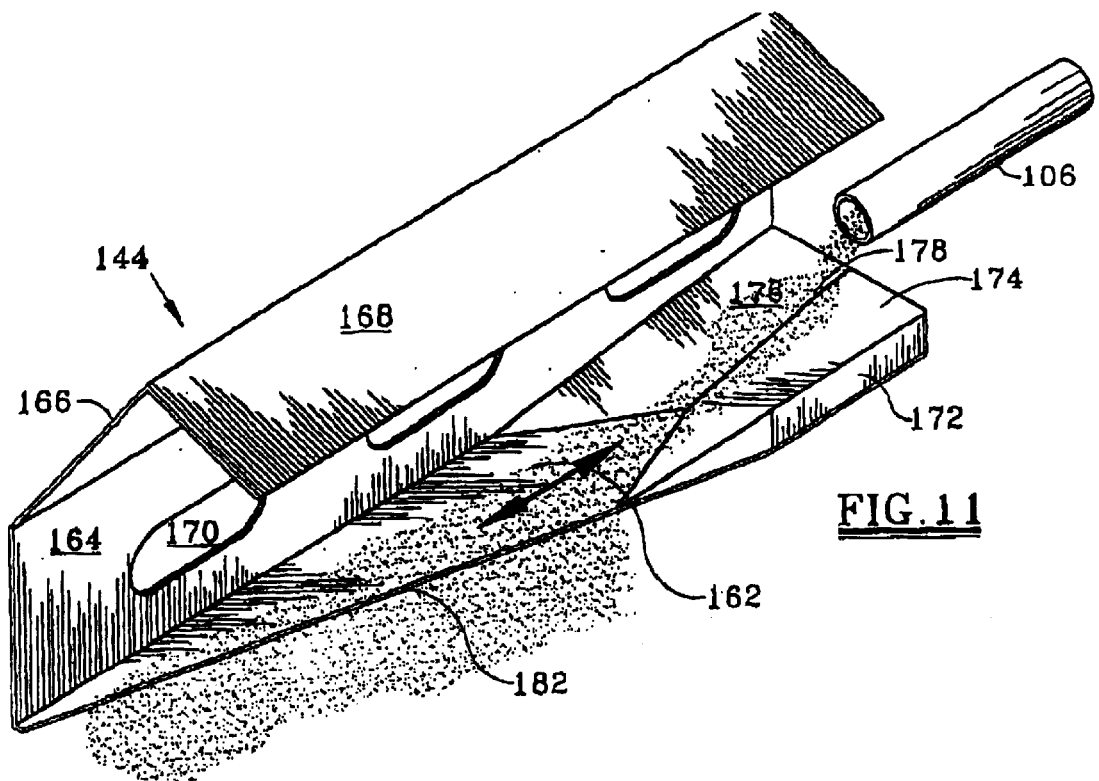
FIG. 11 is a pictorial view of the seasoning conveyor shown in FIG. 10.

FIG. 11 depicts the seasoning tray 144 in greater detail. Seasoning is supplied to the tray 144 from an auger 106. The seasoning tray 144 includes a planar floor 162, a backplate 164, and strengthening roof plates 166 and 168. Roof plates 166 and 168 are one form of a hood which protects the seasoning moving along the seasoning tray floor. As shown in FIG. 11, hole 170 may be provided in the backplate 164 for reducing the weight of the tray and facilitate cleaning. A seasoning tray with floor 162, backplate 164, and plates 166 and 168 may be formed from stainless steel sheet metal which is bent to obtain the desired configuration. Alternatively, welding can be used to fabricate the seasoning tray.

If desired, seasoning from the auger 106 may first be centralized with respect to the floor 162 by block 172 which provides planar surfaces 174 and 176 which meet along valley line 178 to centralize the product being deposited on the seasoning tray. Although a block 172 is depicted, those skilled in the art will appreciate that the centralizer may also be formed from sheet metal, if desired to reduce weight.

Referring again to FIG. 10, it should thus be understood that the seasoning tray 144 will be reciprocated with the upstream linear motion conveyor, and thus moves in the direction indicated in FIG. 11. The angled edge 182 of the tray floor 162 thus results in a "curtain" of seasoning being deposited on the chips moving along the product tray. As shown in FIGS. 10 and 11, the tray floor 162 may have a width of, for example, 3.5 inches, although the length of the tray floor 162 is thirty inches or more, depending on the corresponding lateral width of the tray 96. A similar seasoning tray 148 is provided for providing a curtain of seasoning on product moving along the tray 94.

Figure 12:
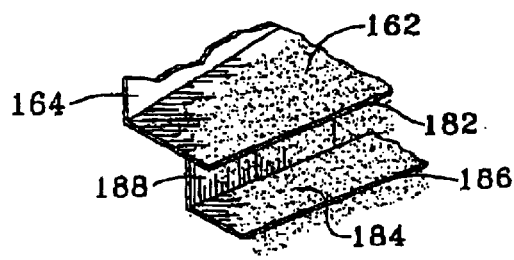
FIG. 12 depicts an alternate embodiment of a portion of a seasoning conveyor.

FIG. 12 depicts a modification of the seasoning tray shown in FIG. 11. Seasoning which drops off the angled edge 182 thus falls on the plate 184 which may be positioned, for example, ¾'s of an inch below the plate 182. Support 188 interconnects the floor 182 with the lower floor 184. Seasoning thus drops off the inclined edge 182 onto the plate 184, then drops off the inclined edge 186 of plate 184 onto the product. If desired, a plurality of tiers may thus be provided so that seasoning drops onto the lower plate and is more evenly distributed before dropping onto the product tray.

Figure 13:
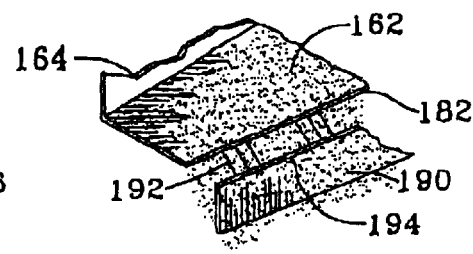
FIG. 13 is yet another embodiment of a portion of the seasoning conveyor.

A further modification to the seasoning tray as shown in FIG. 13. In this modification, a substantially vertical dispenser plate 190, which in some embodiments may be inclined rather than vertical, is positioned below the floor 162 and supported by a plurality of brackets 192 which interconnect the floor with the plate 190. Seasoning thus drops off the edge 182 and falls onto the upper edge 194 of the dispersion plate 190, so that some seasoning fall on the left side of the plate 190 while other seasoning falls on the right side of the plate 190. Multiple dispersion plates positioned at different levels or elevations could be provided, if desired.

Figure 14:
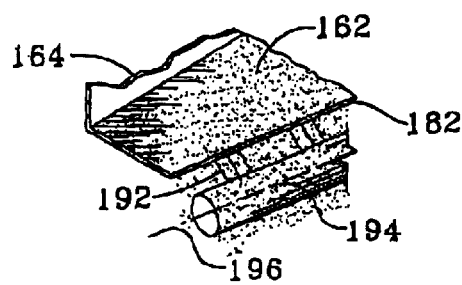
FIG. 14 is an embodiment of a seasoning conveyor which utilizes a rod spreader.

Yet another modification of the seasoning tray as shown in FIG. 14, where product drops off the inclined edge 182 of the planar floor 162 and falls onto the dispersion bar or rod 194. Dispersion bar 194 is supported from the seasoning tray by the supports 192, and has an inclined axis 196 which is parallel with the inclined edge 182. Product thus falls off the edge 182 down to the rod 194, some seasoning drops off the left side of the dispersion bar 194 while other seasoning drops off the right side of the rod 194. The dispersion bar may alternatively be an elongate member having a different cross sectional configuration. An elongate dispenser bar having triangular cross sectional configuration, with the apex of the triangle dividing seasoning to the left side and the right side of the dispersion bar, is thus also contemplated by the present invention.

Figure 15:
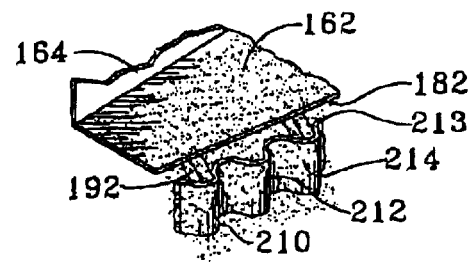
FIG. 15 is an alternate embodiment of a portion of a seasoning conveyor which utilizes a curvilinear shaped edge.
Figure 17:
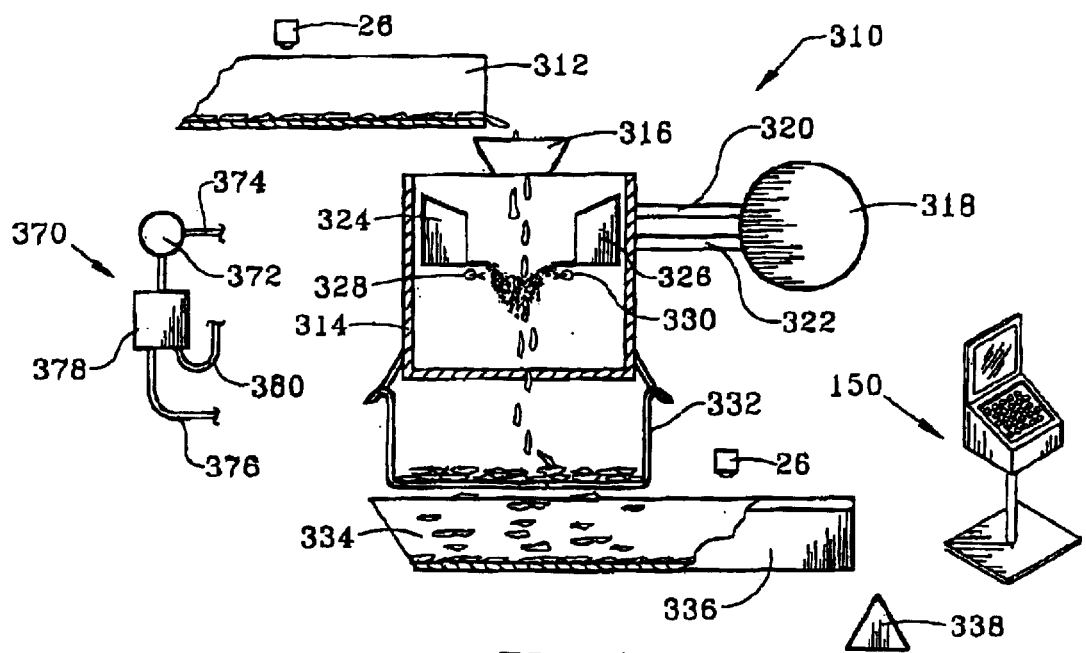
FIG. 17 is a side view, partially in cross-section, of another embodiment of a seasoning system according to the present invention.
Figure 19:
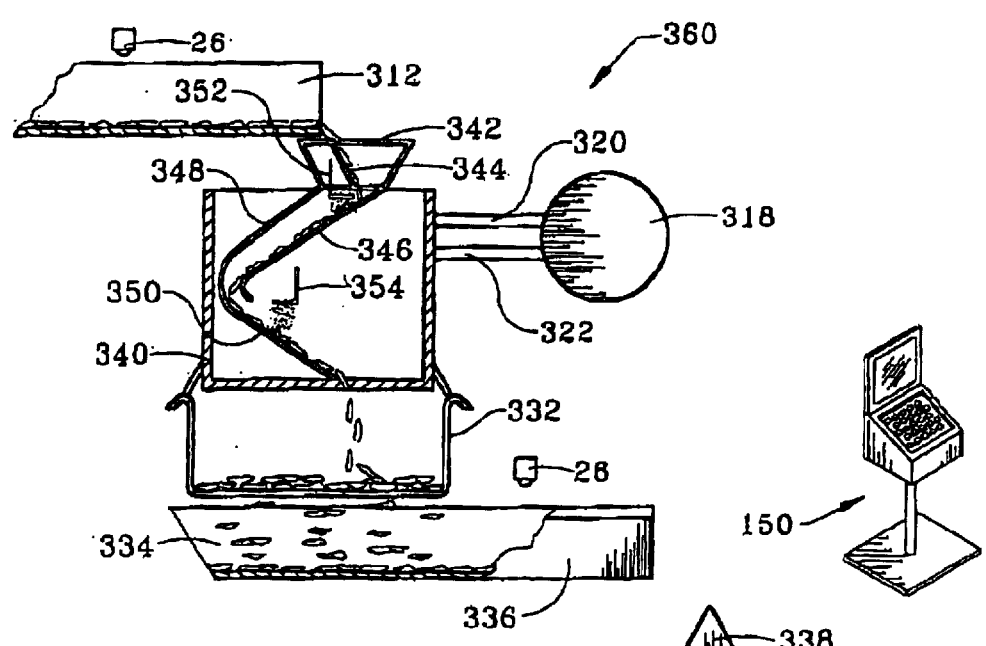
FIG. 19 is a side view, partially in cross-section, of yet another embodiment of a seasoning system according to the present invention.
Figure 18:
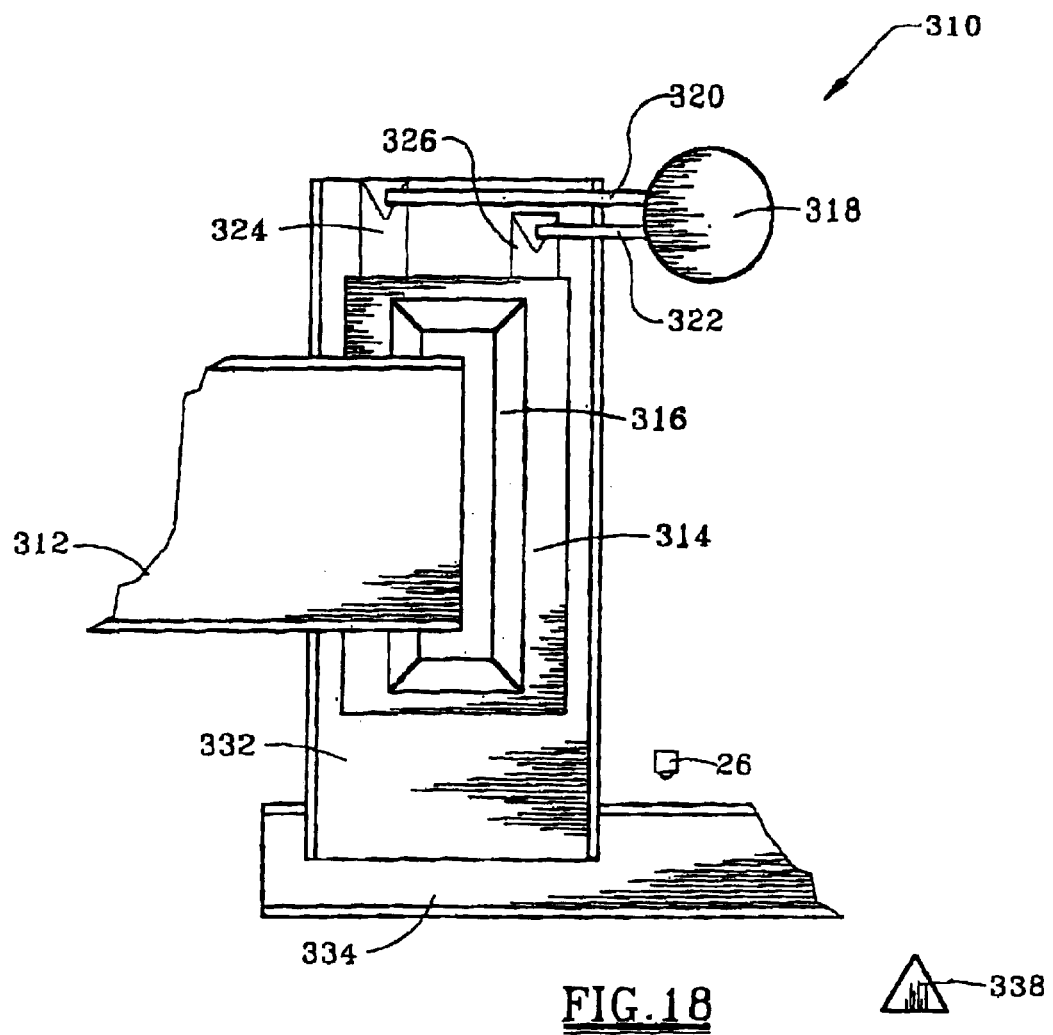
FIG. 18 is a top view of a portion of the seasoning system shown in FIG. 17.

FIG. 15 depicts yet another embodiment of a seasoning tray which is similar to the FIG. 12 embodiment, except that the plate 184 is replaced with plate 213 which has a sinusoidal shaped front surface 210 and a similarly shaped rear surface. The purpose of the sinusoidal surfaces is to further insure that seasoning is uniformly distributed on the product. It must be remembered that the tray floor 162 is reciprocating in the direction shown in FIG. 11. The surfaces 212 and 214 of the front surface 210 and similar surfaces of the back surface of the tray thus engage product as it drops off tray 162 to propel some of the seasoning in angled direction to further insure good distribution of seasoning on the chips.

FIG. 16 is still another embodiment of a seasoning tray 144 according to the present invention which is similar to the FIG. 11 embodiment. Seasoning drops off the inclined edge 182 of the floor 162 and onto the shaft 224, which is rotated by drive motor 216. The drive motor and the seasoning tray 144 may be interconnected by suitable support 218. Two or more brackets 192 may support guide sleeves 220 and 222, which thus acts as simplistic bearings for the rotating shaft 224. FIG. 16 also depicts that the shaft 224 has a plurality of grooves 226 therein. As seasoning drops off the inclined edge 182, some of the seasoning drops onto the shaft and then drops onto the product, while other seasoning falls in one of the grooves 226. Since shaft 224 is rotating about axis 226, seasoning which falls within the grooves gets "propelled" by the motion of the rotating shaft, thereby again insuring that seasoning is reliably distributed on the product.

It should be understood that the seasoning trays as shown on FIGS. 11–16 may be used in the seasoning system as shown in FIG. 10, and also may be used as the seasoning tray which supplies seasoning to the product within the inclined tumble drum 36 as shown in FIG. 1. Both the seasoning trays and the product trays as disclosed herein may be configured for easy cleaning.

As an alternative to the deflector 108 as shown in FIG. 7, an alternate deflector may be a single sheet metal sheet which is both inclined downwardly and extends between the sides 100 and 120. The single sheet metal deflector may thus have a trailing end which engages the side 120 and a leading end which engages the side 100. This alternate deflector insures that seasoning is reasonably distributed along the width of the seasoning tray between the sides 100 and 110, so that it may continue along the seasoning tray to drop off the inclined edge 124.

Another seasoning system according to the present invention includes a first linear motion conveyor, a seasoning module, and preferably a second linear motion conveyor and optionally a third linear motion conveyor. Those skilled in the art will appreciate that each of the first and third conveyors may alternatively be a belt conveyor or a vibratory conveyor. The second conveyor alternatively could be a vibratory conveyor. Sensor 26 as previously described may be used to measure the depth of the product in the tray and thus volume of product moving into the seasoning module. The entire operation may be regulated by an operator control panel 150. If desired, one or more other product volume sensors can be provided in a system for measuring the flowing product at any desired place leading up to, within, or downstream of the seasoning module.

The food product may be discharged from the first conveyor and into a guide shoot for moving through the seasoning module. The seasoning may be supplied by a seasoning supply unit, with seasoning being fed by a flow line to a first seasoning tray unit, and by another flow line to a similar second seasoning tray. Preferably the first and second seasoning trays thus move with the tray of the second conveyor. Each seasoning tray may be constructed according to any of the previously described embodiments. The discharge from each seasoning tray preferably is pushed under a relatively low pressure of less than 10 psi by first and second elongate air knives. First and second air supplied tubes thus gently blow the seasoning onto the chips as they pass through the seasoning unit. The seasoned food product may then be conveyed by one or more conveyors to downstream equipment, such as bagging equipment.

The first and second flow lines from the seasoning unit supply the first and second seasoning trays. A mechanical interconnection of each seasoning tray with the second conveyor is made.

The seasoning system as discussed above thus allows the seasoning product to "free fall" by gravity through the seasoning unit, with the seasoning ideally uniformly coating both sides of each chip. A suitable air recirculation system, including a fan, blower or compressor, outputs air along a flow line to the first and second air knives. Air is thus withdrawn from the seasoning unit through a suction line, and is then filtered by filter unit. Filtered seasoning may be output from the seasoning unit by a supply line. This embodiment thus offers the possibility of uniformly coating chips and other food products with a seasoning, with the seasoning system being relatively simple and having a high throughput rate. Those skilled in the art will appreciate that some food products may have sufficient oil, or otherwise be naturally attracted to seasoning, such that the food product may be directly fed into the seasoning system of the present invention. For other food products, a conventional spray unit may be provided upstream from the seasoning unit for lightly coating the food product with an oil spray to better attract the seasoning to the food product. In a suitable application, the first and second air knives may be positioned approximately 2.8 inches from the top of the enclosure. Accordingly, those skilled will appreciate that the seasoning units may be relatively compact, simple, and highly reliable.

Yet another embodiment of a seasoning system includes a sensor and linear motion conveyors as discussed above, with the output from the seasoning system similarly going to the downstream equipment, such as baggers. An enclosure may be provided with a modified guide shoot which includes an internal plate which initially guides the chips, so that the chips slide down a ramp surface as a layer. A second guide sheet, such as a second sheet with a second ramp surface, is providing for allowing the chips to fall off the first ramp surface and expose the other side of each chip as it slides down the second ramp surface. While sliding down from the first ramp surface, one side of each chip may be seasoned from a first seasoning tray, and while sliding down the second ramp surface, the other side of each chip may be seasoned from the second seasoning tray. Seasoning is supplied to the trays by flow lines as previously discussed. The advantage of this system is that the food product is more gently handled compared to the embodiment discussed above. A disadvantage of this embodiment, however, is that the same size seasoning unit has a much lower throughput rate. If desired, air knives optionally may be used in this embodiment.

Each of the conveyor trays discussed above was disclosed as being a tray having a horizontal tray or pan floor. If desired, one or more of the trays could be inclined to elevate the food product between the receiving end and the discharge end of the conveyor tray using the linear motion inclined conveyor technology as disclosed in U.S. application Ser. No. 09/576,013 filed on May 23, 2000.

It should also be noted that the procedure according to the present invention for quality testing is relatively simple, and requires only a percentage input into the computer 156 for that product line and recipe. Quality testing as disclosed herein has significant advantages compared to a system using a weight-based standard. Volume-based samples provide significant benefits, since the varying product density does not affect the volume calculation. According to the present invention, volume-based samples are taken and are compared to "standard" samples since the volume-based method is simple and yields the best results. Alternatively, accurate product density measurements could be obtained on a periodic or preferably a real time basis which, in conjunction with quality control samples taken by a weight basis, may be compared with "standard" samples.

Various modifications to the seasoning system and to the method as disclosed herein should be apparent from the above description of preferred embodiments. Although the invention has thus been described in detail for these embodiments, it should be understood that this explanation is for illustration, and that the invention is not limited to these embodiments. Alternate components and operating techniques will be apparent to those skilled in the art in view of this disclosure. Additional modifications are thus contemplated and may be made without departing from the spirit of the invention, which is defined by the claims.

What is claimed is:

1. A seasoning system for coating a food product with seasoning comprising:
    a product tray supported on a base and driven to move the food product longitudinally along the tray;
    a drive mechanism for driving the product tray;
    a sensor producing a product feed rate signal functionally related to the volume of product being conveyed along the product tray; and
    a seasoning supply unit for supplying seasoning to the product moved by the product tray in response to the product feed rate signal.

2. The seasoning system as defined in claim 1, wherein the drive mechanism moves the product tray linearly in a slow forward/fast backward manner to slide the product along the product tray.

3. The seasoning system as defined in claim 2, wherein the seasoning supply unit comprises:
    a seasoning tray having an angled discharge edge for uniformly distributing a curtain of seasoning to the product.

4. The seasoning system as defined in claim 3, wherein the seasoning tray is fixed to the product tray.

5. The seasoning system as defined in claim 3, further comprising:
    an angled deflector on an upstream portion of the seasoning tray for deflecting product toward both a left side and a right side of the seasoning tray.

6. The seasoning system as defined in claim 1, wherein the seasoning supply unit further comprises an auger driven by an auger motor, the auger motor speed being controlled in response to the product feed rate signal.

7. The seasoning system as defined in claim 1, further comprising:
    a proportional gate for adjusting the feed rate of product to the product tray in response to the product feed rate signal.

8. The seasoning system as defined in claim 1, further comprising:
    a tumbler including a rotating drum having an inclined drum axis for tumbling the product and the seasoning.

9. The seasoning system as defined in claim 8, further comprising:
    a cross feed conveyor for receiving the product from the tumbler and outputting product to downstream equipment.

10. The seasoning system as defined in claim 1, further comprising:
    another product tray for moving product longitudinally along the another product tray while a spray mechanism sprays a liquid on the product; and
    another drive mechanism for driving the another product tray.

11. The seasoning system as defined in claim 10, further comprising:
    a rotating drum for rotating sprayed product; and
    a tumbler drive motor for rotating the drum.

12. The seasoning system as defined in claim 11, wherein the rotating drum moves linearly with the another product tray driven by the another drive mechanism.

13. The seasoning system as defined in claim 11, further comprising:
    a plastic material liner for fitting within the rotating drum.

14. The seasoning system as defined in claim 13, wherein the plastic material liner includes a plurality of inwardly projecting ribs each having first and second fight surfaces for tumbling the rotating product as a function of the rotational direction of the tumbler drive motor.

15. The seasoning system as defined in claim 1, wherein the seasoning unit further comprises:
    an upper ramp surface for sliding the food product while coating a side of the food product; and a lower ramp surface for sliding the food product while coating an opposing side of the food product.

16. The seasoning system as defined in claim 15, further comprising:
    an upper seasoning tray for dropping season onto the upper ramp surface; and
    a lower seasoning tray for dropping seasoning onto the lower ramp surface.

17. The seasoning system as defined in claim 1, further comprising:

an operator input panel for inputting operator selected parameters; and a computer for controlling movement of the product tray and thus the quantity of product moving along the product tray in response to the operator input signals.

18. The seasoning system as defined in claim 1, wherein the sensor senses an upper level of the product moving along the product tray without contacting the product.

19. The seasoning system as defined in claim 1, further comprising:

a second product tray for moving product longitudinally along the second product tray; and a product deflector for inverting the product discharged from the product tray and input to the second product tray.

20. The seasoning system as defined in claim 19, wherein the drive mechanism powers both the product tray and the second product tray, and the second product tray moves product longitudinally in a reverse direction from product movement provided by the product tray.

21. The seasoning system as defined in claim 19, further comprising:

a first spray mechanism for spraying a first side of the product moving along the first product tray; and a second spray mechanism for spraying an inverted side of the product moving along the second product tray.

22. The seasoning system as defined in claim 1, wherein the seasoning supply unit comprises:

a seasoning tray having a substantially planar floor with an angled discharge edge for uniformly distributing a curtain of seasoning to the product;

a drive mechanism for driving the seasoning tray to move the seasoning along the seasoning tray; and the seasoning tray including a tray side on one side of the floor, the tray floor having a generally triangular configuration.

23. The seasoning system as defined in claim 22, further comprising:

a dispersion member positioned below the floor of the seasoning tray and secured thereto, such that seasoning drops from the angled discharge edge of the floor of the seasoning tray and engages the dispersion member then drops onto the product.

24. A seasoning system for coating a food product with seasoning, comprising:

a product tray driven to move the food product longitudinally along the tray;

a drive mechanism for driving the product tray;

a seasoning unit for applying a seasoning to the product moved by the product tray;

a sensor for producing a product feed rate signal functionally related to the volume of product being conveyed along the product tray; and a proportional gate for adjusting the feed rate of product to the tray in response to the product fed rate signal.

25. The seasoning system as defined in claim 24, wherein the drive mechanism moves the product tray linearly in a slow forward/fast backward manner to side the product along the product tray.

26. The seasoning system as defined in claim 24, further comprising:

a tumbler including a rotating drum having an inclined drum axis for tumbling the product and the seasoning.

27. The seasoning system as defined in claim 26, further comprising:

another product tray for moving product longitudinally along the another product tray while a spray mechanism sprays a liquid on the product.

28. The seasoning system as defined in claim 24, further comprising:

an operator input panel for inputting operator selected parameters; and a computer for controlling movement of the product tray in response to the operator input signals.

29. The seasoning system as defined in claim 24, further comprising:

a second product tray for moving product longitudinally along the second product tray; and a product deflector of inverting the product discharged from the product tray and input to the second product tray.

30. The seasoning system as defined in claim 29, wherein the drive mechanism powers both the product tray and the second product tray, and the second product tray moves product longitudinally in a reverse direction from product movement provided by the product tray.

31. The seasoning system as defined in claim 24, wherein the seasoning supply unit comprises:

a seasoning tray having a substantially planar floor with an angled discharge edge for uniformly distributing a curtain of seasoning to the product;

a drive mechanism for driving the seasoning tray to move the seasoning along the seasoning tray; and the seasoning tray including a tray side on one side of the floor, the tray floor having a generally triangular configuration.

* * * * *